ized to function as a vertical scanning circuit which

(12) United States Patent
Kobayashi et al.

(10) Patent No.: US 11,616,925 B2
(45) Date of Patent: Mar. 28, 2023

(54) PHOTOELECTRIC CONVERSION APPARATUS AND EQUIPMENT

(71) Applicant: CANON KABUSHIKI KAISHA, Tokyo (JP)

(72) Inventors: Hideo Kobayashi, Tokyo (JP); So Hasegawa, Kanagawa (JP); Yu Katase, Kanagawa (JP); Hajime Hayami, Kanagawa (JP); Daisuke Yoshida, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/674,906

(22) Filed: Feb. 18, 2022

(65) Prior Publication Data
US 2022/0272295 A1 Aug. 25, 2022

(30) Foreign Application Priority Data
Feb. 25, 2021 (JP) .............................. JP2021-028981

(51) Int. Cl.
*H04N 5/374* (2011.01)
*H04N 5/3745* (2011.01)
*H04N 5/378* (2011.01)

(52) U.S. Cl.
CPC ........... *H04N 5/3741* (2013.01); *H04N 5/378* (2013.01); *H04N 5/37455* (2013.01)

(58) Field of Classification Search
None
See application file for complete search history.

(56) References Cited

U.S. PATENT DOCUMENTS

| 7,990,440 B2 | 8/2011 | Kobayashi et al. |
| 8,710,558 B2 | 4/2014 | Inoue et al. |
| 8,835,828 B2 | 9/2014 | Kobayashi |
| 8,884,391 B2 | 11/2014 | Fudaba et al. |
| 9,159,750 B2 | 10/2015 | Ikeda et al. |
| 9,264,641 B2 | 2/2016 | Kobayashi |
| 9,305,954 B2 | 4/2016 | Kato et al. |
| 9,357,122 B2 | 5/2016 | Kususaki et al. |

(Continued)

FOREIGN PATENT DOCUMENTS

| JP | 2013-090127 A | 5/2013 |
| JP | 2017-117828 A | 6/2017 |

(Continued)

*Primary Examiner* — Mark T Monk
(74) *Attorney, Agent, or Firm* — Venable LLP

(57) ABSTRACT

A photoelectric conversion apparatus comprises a first substrate having a light-receiving array and a plurality of driving lines for supplying control signals to the array and a second substrate having a first circuit that includes a driver circuit group configured to generate the control signals and is configured to function as a vertical scanning circuit which supplies the control signals to at least some of the driving lines and a second circuit including a circuit group having the same arrangement as that of the driver circuit group. The second circuit overlaps the at least some driving lines. The at least some driving lines include a driving line not electrically connected to the second circuit. The second substrate includes, at a position overlapping the second circuit, an electrically conductive line used for power supply or transfer of a signal different from the control signals.

15 Claims, 12 Drawing Sheets

(56) References Cited

U.S. PATENT DOCUMENTS

| | | | |
|---|---|---|---|
| 9,407,839 B2 | 8/2016 | Yoshida | |
| 9,407,847 B2 | 8/2016 | Maehashi et al. | |
| 9,438,828 B2 | 9/2016 | Itano et al. | |
| 9,509,931 B2 | 11/2016 | Kobayashi et al. | |
| 9,602,752 B2 | 3/2017 | Kobayashi et al. | |
| 9,787,926 B2 | 10/2017 | Yoshida | |
| 9,787,932 B2 | 10/2017 | Totsuka et al. | |
| 9,838,633 B2 | 12/2017 | Muto et al. | |
| 9,876,975 B2 | 1/2018 | Yoshida et al. | |
| 10,003,761 B2 | 6/2018 | Totsuka et al. | |
| 10,321,087 B2 | 6/2019 | Yoshida et al. | |
| 10,594,971 B2 | 3/2020 | Totsuka et al. | |
| 10,798,318 B2 | 10/2020 | Izuhara | |
| 11,268,851 B2 | 3/2022 | Kobayashi et al. | |
| 2013/0092820 A1 | 4/2013 | Takemoto | |
| 2013/0140440 A1 | 6/2013 | Kobayashi | |
| 2016/0227141 A1 | 8/2016 | Kobayashi et al. | |
| 2016/0301886 A1 | 10/2016 | Muto et al. | |
| 2018/0146145 A1* | 5/2018 | Arishima | H01L 27/14645 |
| 2018/0376093 A1 | 12/2018 | Tsukuda et al. | |
| 2021/0021777 A1 | 1/2021 | Kobayashi et al. | |
| 2021/0360180 A1 | 11/2021 | Saito et al. | |
| 2022/0030164 A1 | 1/2022 | Kobayashi | |

FOREIGN PATENT DOCUMENTS

| | | |
|---|---|---|
| JP | 2017-183658 A | 10/2017 |
| JP | 2020-145427 A | 9/2020 |
| WO | 2020/175712 A2 | 9/2020 |

\* cited by examiner

PHOTOELECTRIC CONVERSION APPARATUS AND EQUIPMENT

BACKGROUND OF THE INVENTION

Field of the Invention

The present disclosure relates to a photoelectric conversion apparatus and an equipment.

Description of the Related Art

There is known a photoelectric conversion apparatus formed by bonding two substrates. Japanese Patent Laid-Open No. 2017-183658 describes a technique for generating one substrate of a photoelectric conversion apparatus by combining divided exposure and one-shot exposure.

SUMMARY OF THE INVENTION

If a light-receiving circuit and a vertical scanning circuit are formed on different substrates, the vertical scanning circuit and a driving line for supplying a control signal to the light-receiving circuit are connected by an electrically conductive member. If another electrically conductive line is located near the electrically conductive member extending from the vertical scanning circuit, a resistance value may increase by making the electrically conductive line thinner, and coupling between the electrically conductive member and the electrically conductive line may occur. According to an aspect of the present disclosure, the influence on another electrically conductive line by an electrically conductive member for conveying a control signal from a vertical scanning circuit is reduced.

According to some embodiments, a photoelectric conversion apparatus obtained by bonding a first substrate and a second substrate is provided. The first substrate comprises a light-receiving array including a plurality of light-receiving circuits arranged in an array, and a plurality of driving lines configured to supply control signals to the light-receiving array. The second substrate comprises a first circuit that includes a driver circuit group configured to generate the control signals and is configured to function as a vertical scanning circuit which supplies the control signals to at least some of the plurality of driving lines, and a second circuit including a circuit group having the same arrangement as that of the driver circuit group. The second circuit is located at a position overlapping the at least some driving lines supplied with the control signals from the first circuit in a planar view with respect to a boundary between the first substrate and the second substrate. The at least some driving lines supplied with the control signals from the first circuit include a driving line which is not electrically connected to the second circuit. The second substrate includes, at a position overlapping the second circuit in the planar view with respect to the boundary, an electrically conductive line used for one of power supply or transfer of a signal different from the control signals.

Further features of the present disclosure will become apparent from the following description of exemplary embodiments with reference to the attached drawings.

DESCRIPTION OF THE EMBODIMENTS

Figure 1:
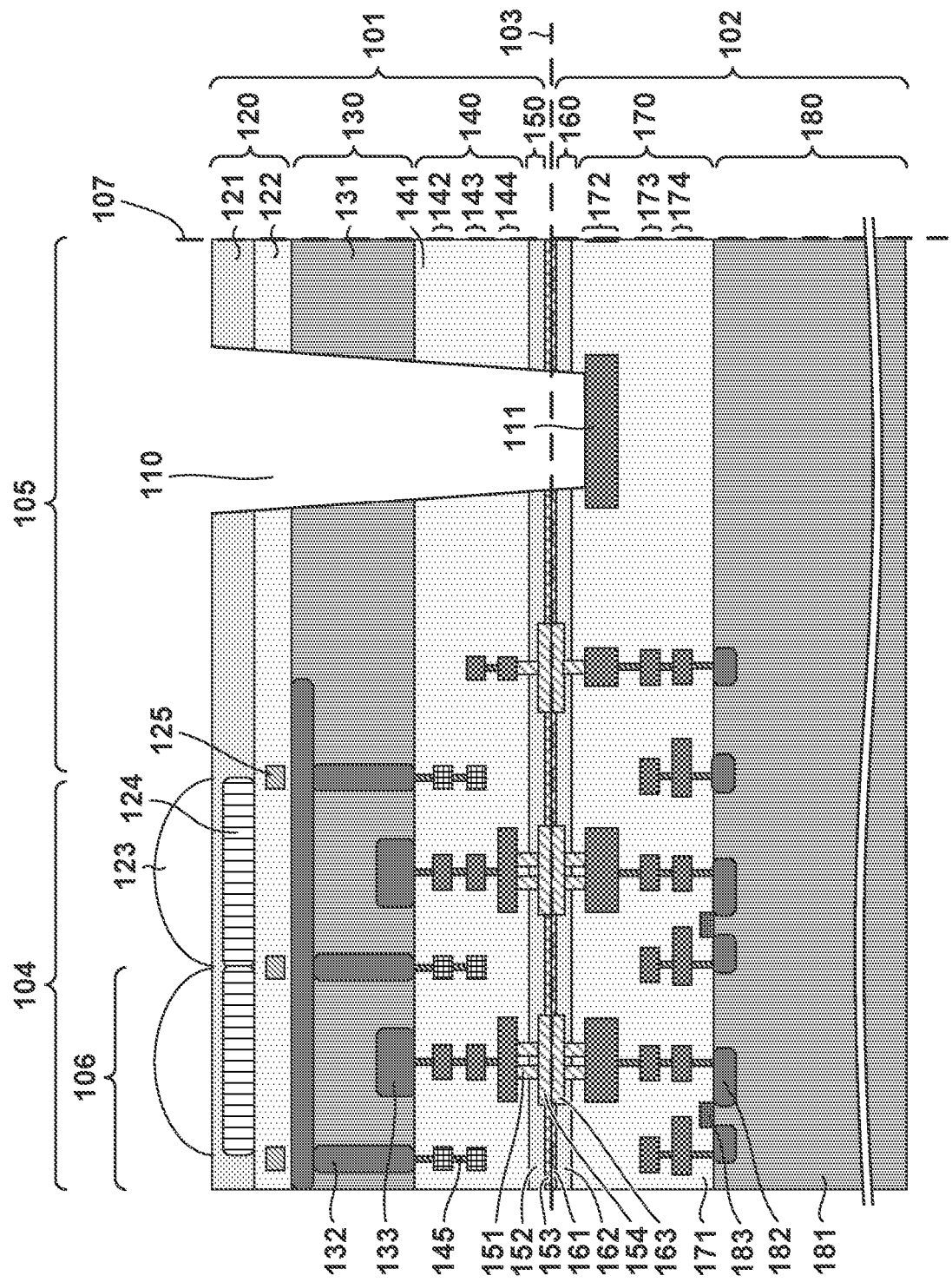
FIG. 1 is a view for explaining an example of the arrangement of a photoelectric conversion apparatus according to a first embodiment.

Hereinafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate. Furthermore, in the attached drawings, the same reference numerals are given to the same or similar configurations, and redundant description thereof is omitted.

First Embodiment

An example of the structure of a photoelectric conversion apparatus 100 according to the first embodiment of the present disclosure will be described with reference to FIG. 1. FIG. 1 is a sectional view focusing on a portion close to a side surface 107 of the photoelectric conversion apparatus 100. The photoelectric conversion apparatus 100 is formed by a light-receiving substrate 101 and a circuit substrate 102. The light-receiving substrate 101 and the circuit substrate 102 are superimposed on each other, and are bonded at a boundary 103 between the light-receiving substrate 101 and the circuit substrate 102. "Bonded" means maintaining the state in which the light-receiving substrate 101 and the circuit substrate 102 are superimposed on each other, and may be expressed as "adhered" in accordance with a practical method.

An embodiment in which the photoelectric conversion apparatus 100 is used for image capturing will mainly be described below. In this case, the photoelectric conversion apparatus 100 can be used as an image sensor for generating an image. Furthermore, other examples of the photoelectric conversion apparatus 100 are a distance measuring element (a sensor used for distance measurement using focus detection or Time Of Flight (TOF)), a photometric element (a sensor used to measure an incident light amount or the like), and a Light Detection and Ranging (LiDAR) sensor. The embodiment to be described below is applicable to any photoelectric conversion apparatus.

The photoelectric conversion apparatus 100 includes a light-receiving region 104 and a peripheral region 105 in a planar view with respect to the boundary 103. The light-receiving region 104 is a region where a plurality of light-receiving circuits 106 are arrayed. An example in which each light-receiving circuit 106 includes a Single Photon Avalanche Diode (SPAD) sensor will be described with reference to FIG. 1. Alternatively, each light-receiving circuit 106 may have another structure, for example, may include a Complementary Metal Oxide Semiconductor (CMOS) sensor. In the peripheral region 105, an opening 110 extending to an electrode pad 111 for external connection is formed.

The light-receiving substrate 101 includes an optical layer 120, a semiconductor layer 130, a wiring layer 140, and a bonding layer 150. The arrangement of each layer of the light-receiving substrate 101 will be described in detail below.

The semiconductor layer 130 includes a semiconductor substrate 131 on which the plurality of light-receiving circuits 106 are formed. The semiconductor substrate 131 uses, for example, silicon as a material. On the semiconductor substrate 131, impurity regions 132 and 133 are formed. Each impurity region 132 functions as the anode of the SPAD sensor. Each impurity region 133 functions as the cathode of the SPAD sensor. In this way, each light-receiving circuit 106 is formed by the impurity regions 132 and 133.

The wiring layer 140 includes an interlayer insulating film 141, a plurality of electrically conductive patterns 142 to 144 buried in the interlayer insulating film 141, and a plurality of vias 145. Each of the plurality of vias 145 connects different electrically conductive patterns or the electrically conductive pattern and the impurity region. The example of FIG. 1 shows the electrically conductive patterns 142 to 144 of three layers but the number of layers of the electrically conductive patterns is not limited to this. Among the electrically conductive patterns 142 to 144 of the three layers, the electrically conductive pattern 144 is closest to the boundary 103, the electrically conductive pattern 143 is the second closest to the boundary 103, and the electrically conductive pattern 142 is the third closest (that is, farthest) to the boundary 103.

The bonding layer 150 is formed by vias 151, a barrier film 152, a bonding film 153, and a plurality of electrodes 154. The plurality of electrodes 154 all face the boundary 103. The vias 151 connect the electrodes 154 and the electrically conductive pattern 144. The electrodes 154 and the vias 151 use, for example, copper as a material.

The bonding film 153 is arranged around the plurality of electrodes 154, and insulates the plurality of electrodes 154 from each other. The bonding film 153 faces the boundary 103. The bonding film 153 uses, for example, an oxide as a material. The barrier film 152 is located between the wiring layer 140 and the bonding film 153. The barrier film 152 uses, for example, a nitride as a material. The barrier film 152 prevents copper as the material of the electrodes 154 from diffusing to the semiconductor layer 130.

The optical layer 120 is formed by an optical interlayer film 122, optical separation members 125, a color filter interlayer film 121, color filters 124, and microlenses 123. The optical separation members 125 are buried in the optical interlayer film 122. Each optical separation member 125 suppresses color mixture between the adjacent light-receiving circuits 106. The color filters 124 are buried in the color filter interlayer film 121. Each microlens 123 collects light entering from the side of the optical layer 120 (the upper side in FIG. 1) to the light-receiving circuit 106.

The circuit substrate 102 includes a semiconductor layer 180, a wiring layer 170, and a bonding layer 160. The circuit substrate 102 includes a circuit that generates a control signal for controlling the light-receiving circuit 106 and a circuit that processes a signal generated by the light-receiving circuit 106.

The semiconductor layer 180 includes a semiconductor substrate 181. The semiconductor substrate 181 uses, for example, silicon as a material. On the semiconductor substrate 181, impurity regions 182 are formed. Furthermore, each gate electrode 183 is formed to cover part of the surface of the semiconductor substrate 181. The impurity region 182 and the gate electrode 183 form a transistor. In this way, in the semiconductor layer 180, a plurality of circuit elements are formed.

The wiring layer 170 is formed by an interlayer insulating film 171, a plurality of electrically conductive patterns 172 to 174 buried in the interlayer insulating film 171, and a plurality of vias. Among the electrically conductive patterns 172 to 174 of three layers, the electrically conductive pattern 172 is closest to the boundary 103, the electrically conductive pattern 173 is the second closest to the boundary 103, and the electrically conductive pattern 174 is the third closest (that is, farthest) to the boundary 103. The electrically conductive patterns 172 to 174 may use aluminum as a material.

The electrically conductive pattern 172 includes the electrode pad 111 for external connection. As described above, the electrode pad 111 is exposed to the outside by the opening 110. When implementing the photoelectric conversion apparatus 100 in a package, a bonding wire is connected to the electrode pad 111. The electrode pad 111 may use aluminum as a material so as to enable wire bonding.

The bonding layer 160 is formed by a bonding film 161, a barrier film 162, and a plurality of electrodes 163. When the bonding films 153 and 161 are bonded and the electrodes 154 and 163 are bonded, the light-receiving substrate 101 and the circuit substrate 102 are bonded.

Figure 2A:
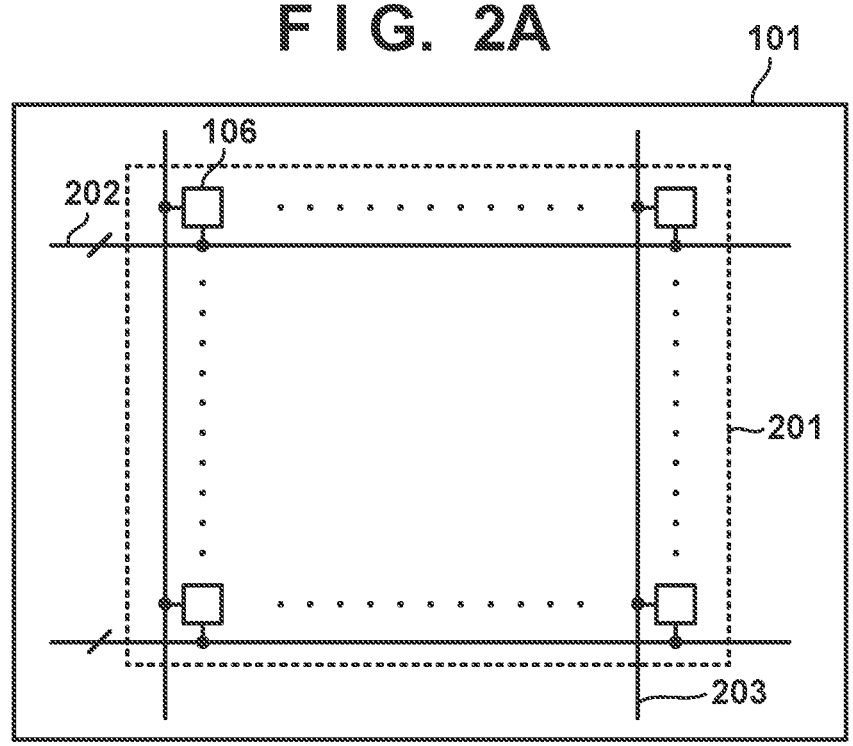
FIGS. 2A and 2B are views for explaining an example of the circuit layout of the photoelectric conversion apparatus according to the first embodiment.
Figure 2B:
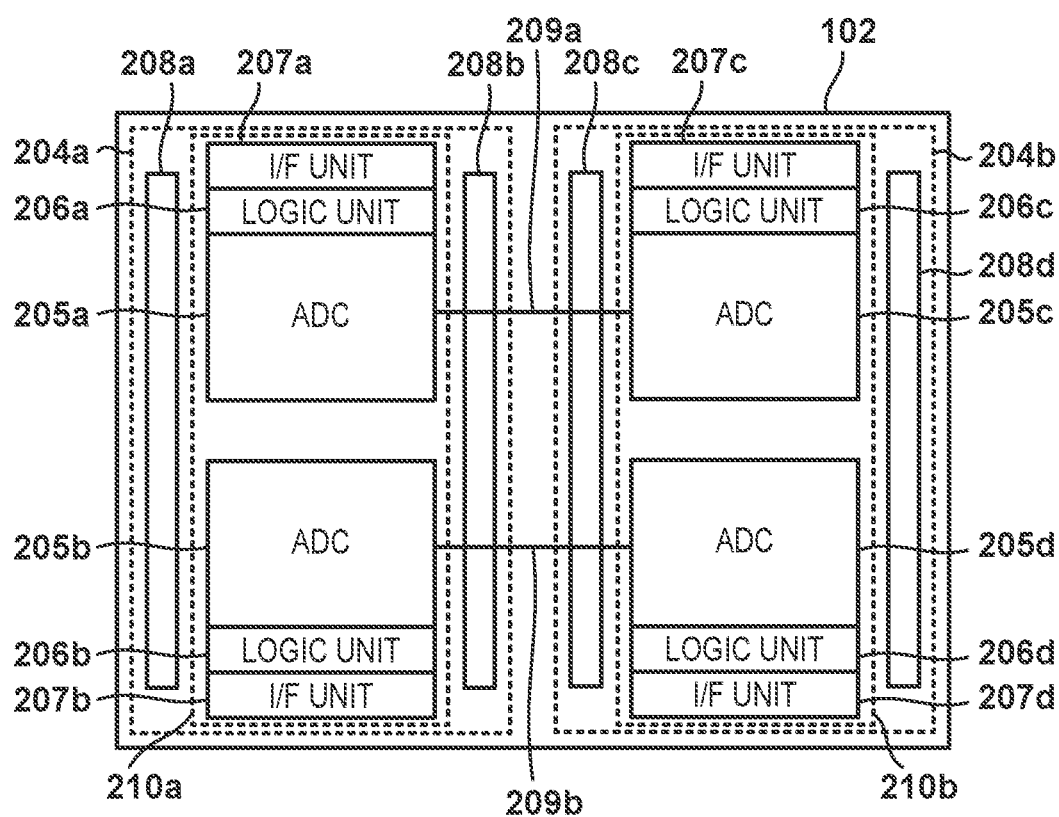

An example of the circuit layout of the photoelectric conversion apparatus 100 according to the first embodiment will be described with reference to FIGS. 2A and 2B. The circuit layout is a layout in the planar view with respect to the boundary 103. The same applies to the following circuit layouts. FIG. 2A shows an example of the layout of the light-receiving substrate 101, and FIG. 2B shows an example of the layout of the circuit substrate 102. In the example shown in FIG. 1, the photoelectric conversion apparatus 100 includes a light-receiving array 201, a plurality of Analog-to-Digital (A/D) conversion units 205, a plurality of logic units 206, a plurality of interface (I/F) units 207, and a plurality of vertical scanning circuits 208. In the following description, when focusing on an individual component among the plurality of components, an alphabetical subscript is added to reference numeral. For example, an A/D conversion unit 205a represents a specific one of the plurality of A/D conversion units 205.

The light-receiving array 201 is included in the light-receiving substrate 101. In the light-receiving array 201, the light-receiving circuits 106 are arranged in a two-dimensional array. Each light-receiving circuit 106 converts incident light into an electrical signal. When the photoelectric conversion apparatus 100 is used as a solid-state image capturing apparatus, the light-receiving circuit 106 can also be called a pixel circuit. The light-receiving substrate 101 includes a plurality of driving lines 202 provided for the rows of the light-receiving array 201, respectively, and a plurality of signal lines 203 provided for the columns of the light-receiving array 201, respectively. The row of the light-receiving array 201 indicates the plurality of light-receiving circuits 106 arrayed in the horizontal direction in FIG. 1. The column of the light-receiving array 201 indicates the plurality of light-receiving circuits 106 arrayed in the vertical direction in FIG. 1. Each driving line 202 is an electrically conductive line for supplying a control signal to the light-receiving array 201. Each signal line 203 is an electrically conductive line for conveying a signal generated in the light-receiving array 201.

The plurality of A/D conversion units 205, the plurality of logic units 206, the plurality of interface units 207, and the plurality of vertical scanning circuits 208 are included in the circuit substrate 102. The circuit substrate 102 includes a left half region 204a and a right half region 204b. Some layers in the regions 204a and 204b may be formed in twice using a common mask set. For example, the semiconductor layer 180, the electrically conductive patterns 173 and 174, and the vias between these layers may be formed by divided exposure using the common mask in the regions 204a and 204b. As a result, the semiconductor layer 180, the electrically conductive patterns 173 and 174, and the vias between these layers have the same circuit arrangement in the regions 204a and 204b. On the other hand, the electrically conductive pattern 172 and the vias connected to it may be formed by one-shot exposure. In the example of FIG. 2B, the circuit substrate 102 is divided into the two regions 204a and 204b. However, the circuit substrate 102 may be divided into three or more regions having the same arrangement except for some parts.

Each of the plurality of vertical scanning circuits 208 can generate a control signal to be supplied to the light-receiving circuit 106. The connection relationship among the vertical scanning circuits 208 and the driving lines 202 will be described later. Vertical scanning circuits 208a and 208b are included in the region 204a. Vertical scanning circuits 208c and 208d are included in the region 204b. Since the regions 204a and 204b have the same circuit arrangement, the vertical scanning circuits 208a and 208c have the same circuit arrangement and the vertical scanning circuits 208b and 208d have the same circuit arrangement. All the vertical scanning circuits 208a to 208d may have the same circuit arrangement.

The A/D conversion unit 205a converts, into digital signals, analog signals generated in some light-receiving circuits 106 of the light-receiving array 201. A logic unit 206a reads out the digital signals from the A/D conversion unit 205a, and processes them. For example, the logic unit 206a may perform correction processing, complement processing, or the like for the digital signals. An interface unit 207a outputs the digital signals processed by the logic unit 206a to the outside of the photoelectric conversion apparatus 100. A/D conversion units 205b to 205d, logic units 206b to 206d, and interface units 207b to 207d are the same as the A/D conversion unit 205a, the logic unit 206a, and the interface unit 207a, respectively, and a repetitive description thereof will be omitted.

The A/D conversion unit 205, the logic unit 206, and the interface unit 207 form the processing circuit 210 that processes the signals obtained in the light-receiving array 201. The circuit substrate 102 includes a processing circuit 210 in each of the regions 204a and 204b. More specifically, the region 204a includes a processing circuit 210a, and the region 204b includes a processing circuit 210b. The processing circuits 210a and 210b have the same circuit arrangement in a portion, below the electrically conductive pattern 173, of the circuit substrate 102.

The processing circuits 210a and 210b are electrically connected by electrically conductive lines 209 included in the uppermost electrically conductive pattern. In the example of FIG. 2B, the A/D conversion units 205a and 205c are electrically connected by an electrically conductive line 209a, and the A/D conversion units 205b and 205d are electrically connected by an electrically conductive line 209b. The electrically conductive lines 209a and 209b are included in, for example, the uppermost electrically conductive pattern 172 of the circuit substrate 102 formed by one-shot exposure.

The vertical scanning circuits 208b and 208c are located between the processing circuits 210a and 210b. Therefore, the electrically conductive lines 209a and 209b extend to overlap the vertical scanning circuits 208b and 208c and intersect the vertical scanning circuits 208b and 208c in the planar view with respect to the boundary 103. The vertical scanning circuit 208a is located between the processing circuit 210a and the edge of the photoelectric conversion apparatus 100. The vertical scanning circuit 208d is located between the processing circuit 210b and the edge of the photoelectric conversion apparatus 100. Both the electrically conductive lines 209a and 209b do not intersect the vertical scanning circuits 208a and 208d in the planar view with respect to the boundary 103. The processing circuit 210a is located between the vertical scanning circuits 208a and 208b and is also located between the vertical scanning circuits 208a and 208c. The processing circuit 210b is located between the vertical scanning circuits 208d and 208b and is also located between the vertical scanning circuits 208d and 208c. Each of the vertical scanning circuits 208b and 208c is located at a position overlapping the light-receiving array 201 in the planar view with respect to the boundary 103. Each of the vertical scanning circuits 208a and 208d is located at a position not overlapping the light-receiving array 201 in the planar view with respect to the boundary 103. The vertical scanning circuit 208b is located between the vertical scanning circuit 208c and the processing circuit 210a. The vertical scanning circuit 208c is located between the vertical scanning circuit 208b and the processing circuit 210b.

Figure 3:
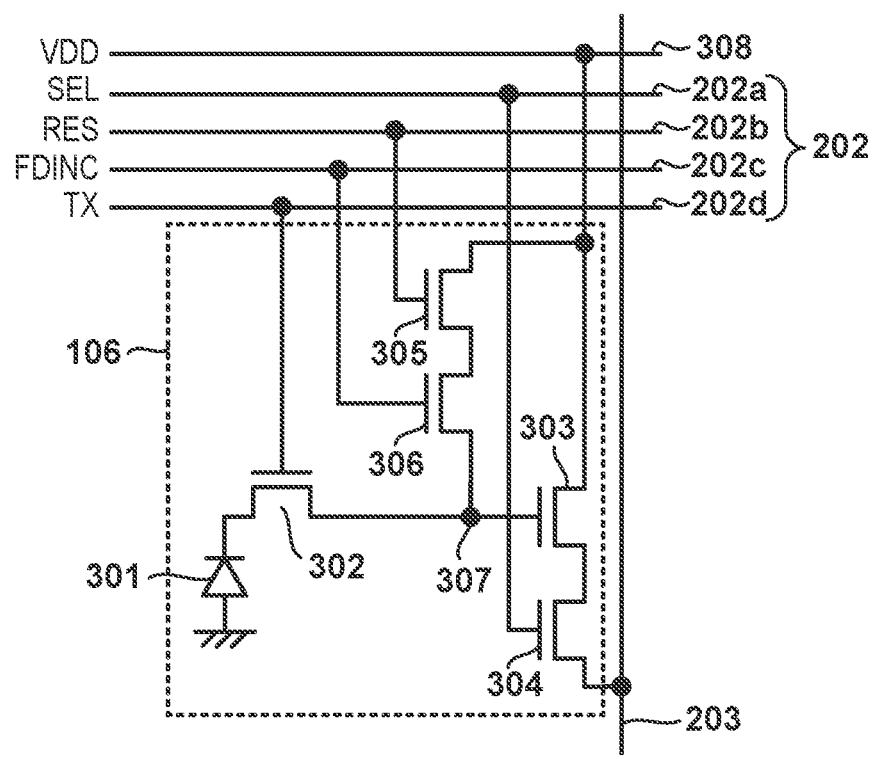
FIG. 3 is a circuit diagram for explaining an example of the circuit arrangement of a light-receiving circuit according to the first embodiment.

A practical example of the circuit arrangement of the light-receiving circuit 106 will be described with reference to a circuit diagram shown in FIG. 3. The light-receiving circuit 106 can have an arbitrary arrangement for converting incident light into an electrical signal. An example will be described with reference to FIG. 3 but the light-receiving circuit 106 may have another arrangement.

In the example described with reference to FIG. 3, the light-receiving circuit 106 includes a photoelectric conversion element 301, a transfer transistor 302, an amplification transistor 303, a selection transistor 304, a reset transistor 305, and a gain change transistor 306. In the example shown in FIG. 3, the four driving lines 202 are arranged for each row of the light-receiving array 201. The driving line 202a supplies a control signal SEL. The driving line 202b supplies a control signal RES. The driving line 202c supplies a control signal FDINC. Depending on the arrangement of the light-receiving circuit 106, only one driving line or another number of driving lines, which is two or more, may be arranged for each row.

The photoelectric conversion element 301 converts incident light into charges, and accumulates them. The photoelectric conversion element 301 may be, for example, a photodiode or a phototransistor. The photoelectric conversion element 301 may be a CMOS sensor or a SPAD sensor.

The photoelectric conversion element 301 is connected to a floating diffusion 307 via the transfer transistor 302. The vertical scanning circuit 208 supplies a control signal TX to the gate of the transfer transistor 302 via the driving line 202d. When the control signal TX is set to the active level, the transfer transistor 302 is set in an electrically conductive state. The signal charges accumulated in the photoelectric conversion element 301 are accordingly transferred to the floating diffusion 307. The charge signal transferred from the photoelectric conversion element 301 is converted into a voltage signal by the parasitic capacitance of the floating diffusion 307.

The floating diffusion 307 is also connected to the gate of the amplification transistor 303. One main electrode of the amplification transistor 303 is connected to the signal line 203 via the selection transistor 304. The other main electrode of the amplification transistor 303 is connected to a power supply line 308 supplied with a power supply voltage VDD. The vertical scanning circuit 208 supplies the control signal SEL to the gate of the selection transistor 304 via the driving line 202a. When the control signal SEL is set to the active level, the selection transistor 304 is set in the electrically conductive state. The one main electrode of the amplification transistor 303 is accordingly connected to a current source 402 (FIG. 4) of the A/D conversion unit 205. This causes the amplification transistor 303 to operate as a source follower, and a signal corresponding to the potential of the floating diffusion 307 is read out into the signal line 203.

The reset transistor 305 is connected between the gain change transistor 306 and the power supply line 308. The vertical scanning circuit 208 supplies the control signal RES to the gate of the reset transistor 305 via the driving line 202b. When the control signal RES is set to the active level, the reset transistor 305 is set in the electrically conductive state. The potential of the floating diffusion 307 is accordingly reset to the power supply voltage VDD.

The gain change transistor 306 is connected between the floating diffusion 307 and the reset transistor 305. The vertical scanning circuit 208 supplies the control signal FDINC to the gate of the gain change transistor 306 via the driving line 202c. When the control signal FDINC is set to the active level, the gain change transistor 306 is set in the electrically conductive state. When the gain change transistor 306 is set in the electrically conductive state, the gain of charge-to-voltage conversion by the floating diffusion 307 is changed.

The light-receiving circuit 106 is not limited to the above-described arrangement. For example, the number of signal lines 203 may be one or two or more for each column of the light-receiving array 201. One light-receiving circuit 106 may include a plurality of selection transistors 304. The floating diffusion 307 may be shared by the plurality of photoelectric conversion elements 301.

A practical example of the circuit arrangement of the A/D conversion units 205a and 205c will be described with reference to a circuit diagram shown in FIG. 4. The same may apply to the A/D conversion units 205b and 205d and a description thereof will be omitted. The A/D conversion unit 205 can have an arbitrary arrangement for converting an analog signal into a digital signal. An example will be described with reference to FIG. 4 but the A/D conversion unit 205 may have another arrangement.

Each of the A/D conversion units 205a and 205c includes a plurality of A/D conversion circuits 400 corresponding to the columns of the light-receiving array 201, a ramp signal generation circuit 410, and a counter 420. Each A/D conversion circuit 400 and each signal line 203 are electrically connected by an electrically conductive member 401. The electrically conductive member 401 extends in a direction orthogonal to the boundary 103. The electrically conductive member 401 is formed by parts of the electrically conductive patterns (the electrically conductive pattern 142 and the like), the vias (the vias 145 and the like), and the electrodes (the electrodes 154 and the like) included in the wiring layer 140, the bonding layers 150 and 160, and the wiring layer 170.

Each A/D conversion circuit 400 includes the current source 402, a comparator 403, and memories 404 and 405. The current source 402 generates a bias current to be supplied to the amplification transistor 303 of the light-receiving circuit 106 via the electrically conductive member 401 and the signal line 203.

The light-receiving circuit 106 supplies a signal to the inverting input terminal of the comparator 403, and the ramp signal generation circuit 410 supplies a ramp signal to the non-inverting input terminal of the comparator 403. The comparator 403 supplies, to the memory 404, the comparison result of the ramp signal and the signal from the light-receiving circuit 106. The memory 404 stores the count value of the counter 420 when the output value of the comparator 403 is inverted. This count value represents the digital value of the signal from the light-receiving circuit 106. The digital signal stored in the memory 404 is transferred to the memory 405, and then read out by the logic unit 206.

Figure 4:
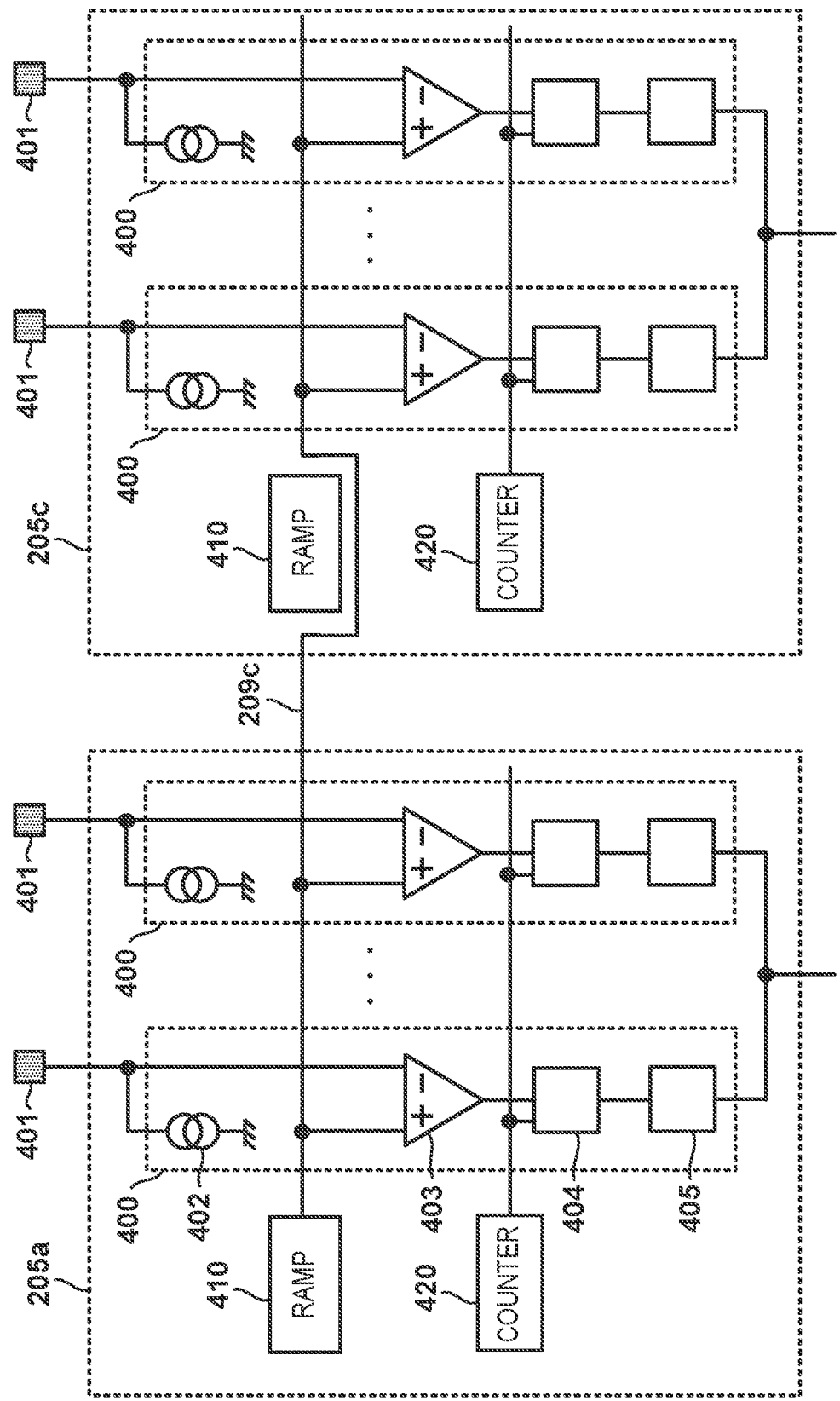
FIG. 4 is a circuit diagram for explaining an example of the circuit arrangement of an A/D conversion unit according to the first embodiment.

FIG. 4 shows, as an example of the electrically conductive line 209a that connects the A/D conversion units 205a and 205c shown in FIG. 2B, the electrically conductive line 209c for conveying the ramp signal. The ramp signal generated by the ramp signal generation circuit 410 included in the A/D conversion unit 205a is supplied not only to the A/D conversion circuit 400 of the A/D conversion unit 205a but also to the A/D conversion circuit 400 of the A/D conversion unit 205c via the electrically conductive line 209c. The use of the common ramp signal reduces the difference in characteristics between the A/D conversion units 205a and 205c. The ramp signal generation circuit 410 of the A/D conversion unit 205c has the same circuit arrangement as that of the ramp signal generation circuit 410 of the A/D conversion unit 205a. The ramp signal generation circuit 410 of the A/D conversion unit 205c need not be used and operated. In the example shown in FIG. 4, the common counter 420 is arranged for the plurality of A/D conversion circuits 400. Alternatively, an individual counter 420 may be arranged for each A/D conversion circuit 400.

Figure 5:
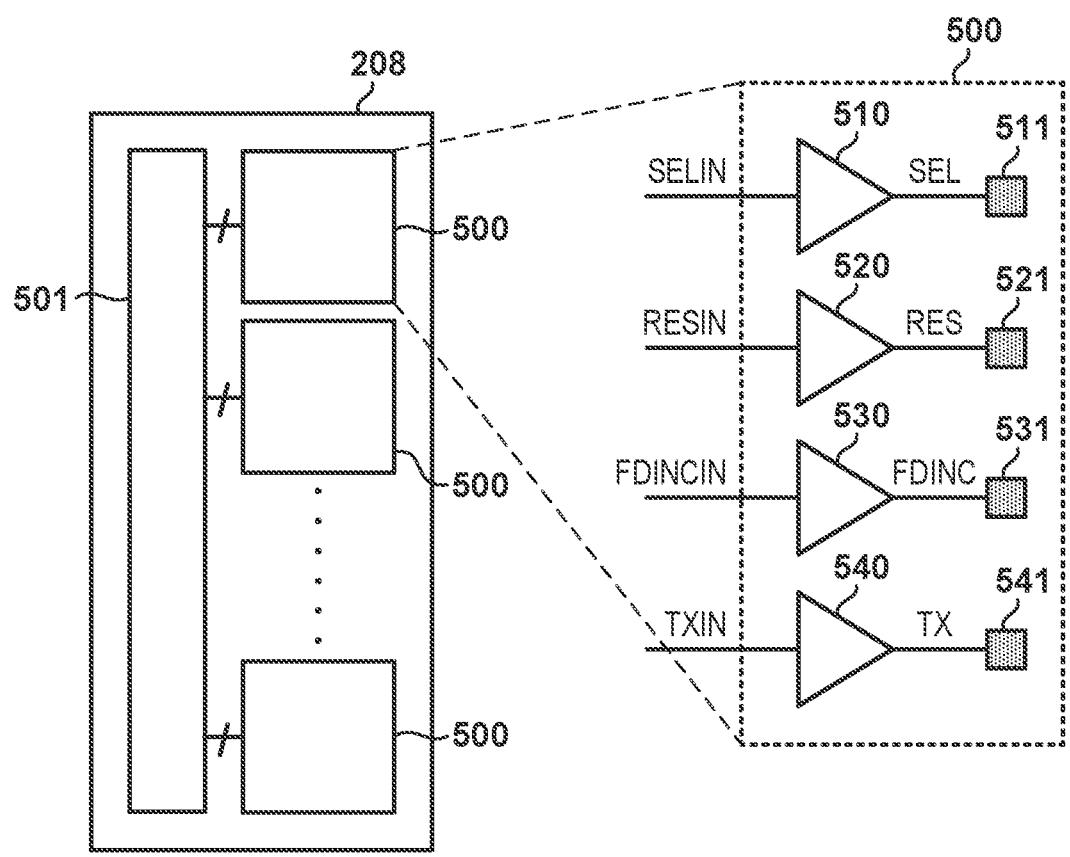
FIG. 5 is a circuit diagram for explaining an example of the circuit arrangement of a vertical scanning circuit according to the first embodiment.

A practical example of the circuit arrangement of the vertical scanning circuit 208 will be described with reference to a circuit diagram shown in FIG. 5. All the vertical scanning circuits 208a to 208d can have this circuit arrangement. The vertical scanning circuit 208 includes row driver circuits 500 arranged in correspondence with the respective rows of the light-receiving array 201, and a shift register 501. Each row driver circuit 500 includes a driver circuit group of driver circuits 510, 520, 530, and 540. FIG. 5 shows the overall arrangement of the vertical scanning circuit 208 on the left side, and shows the arrangement of one row driver circuit 500 on the right side.

The driver circuit 510 generates the control signal SEL in accordance with a control signal SELIN supplied from the shift register 501, and supplies it to an electrically conductive member 511. The electrically conductive member 511 electrically connects the driver circuit 510 and the driving line 202a. The driver circuit 520 generates the control signal RES in accordance with a control signal RESIN supplied from the shift register 501, and supplies it to an electrically conductive member 521. The electrically conductive member 521 electrically connects the driver circuit 520 and the driving line 202b. The driver circuit 530 generates the control signal FDINC in accordance with a control signal FDINCIN supplied from the shift register 501, and supplies it to an electrically conductive member 531. The electrically conductive member 531 electrically connects the driver circuit 530 and the driving line 202c. The driver circuit 540 generates the control signal TX in accordance with a control signal TXIN supplied from the shift register 501, and supplies it to an electrically conductive member 541. The electrically conductive member 541 electrically connects the driver circuit 540 and the driving line 202d.

Each of the electrically conductive members 511, 521, 531, and 541 extends from the vertical scanning circuit 208 (more specifically, the row driver circuit 500) in a direction orthogonal to the boundary 103. Each of the electrically conductive members 511, 521, 531, and 541 is formed by parts of the electrically conductive patterns (the electrically conductive pattern 142 and the like), the vias (the vias 145 and the like), and the electrodes (the electrodes 154 and the like) included in the wiring layer 140, the bonding layers 150 and 160, and the wiring layer 170.

Figure 6A:
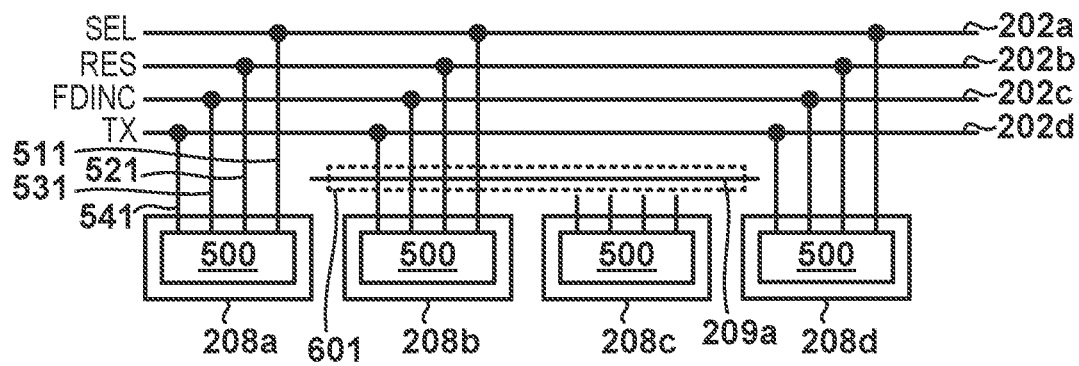
FIGS. 6A to 6C are views for explaining the connection relationships among vertical scanning circuits and driving lines according to the first embodiment.

The connection relationship among the vertical scanning circuits 208 and the driving lines 202 will be described with reference to FIGS. 6A to 7C. FIG. 6A shows the connection relationship among the four vertical scanning circuits 208a to 208d and the four driving lines 202a to 202d for one row of the light-receiving array 201. The same connection relationship may apply to the remaining rows of the light-receiving array 201. As described above, the electrically conductive line 209a is located between the vertical scanning circuits 208b and 208c and the driving lines 202 but is not located between the vertical scanning circuits 208a and 208d and the driving lines 202.

Each of the vertical scanning circuits 208a, 208b, and 208d is electrically connected to all the four driving lines 202a to 202d for one row of the light-receiving array 201. By supplying the control signal from the two ends and center of the substrate to the one driving line 202, it becomes possible to control the light-receiving circuit 106 at high speed. If the same connection relationship applies to the remaining rows of the light-receiving array 201, each of the vertical scanning circuits 208a, 208b, and 208d is electrically connected to all the plurality of driving lines 202 arranged for the light-receiving array 201, thereby supplying the control signals.

On the other hand, the vertical scanning circuit 208c is not electrically connected to any of the four driving lines 202a to 202d for one row of the light-receiving array 201. If the same connection relationship applies to the remaining rows of the light-receiving array 201, the vertical scanning circuit 208c is not electrically connected to any of the plurality of driving lines 202 arranged for the light-receiving array 201. In this specification, a circuit that includes the row driver circuit 500 to be able to generate control signals but cannot supply the control signals to any of the driving lines 202, like the vertical scanning circuit 208c, is also expressed as a vertical scanning circuit.

Figure 7A:
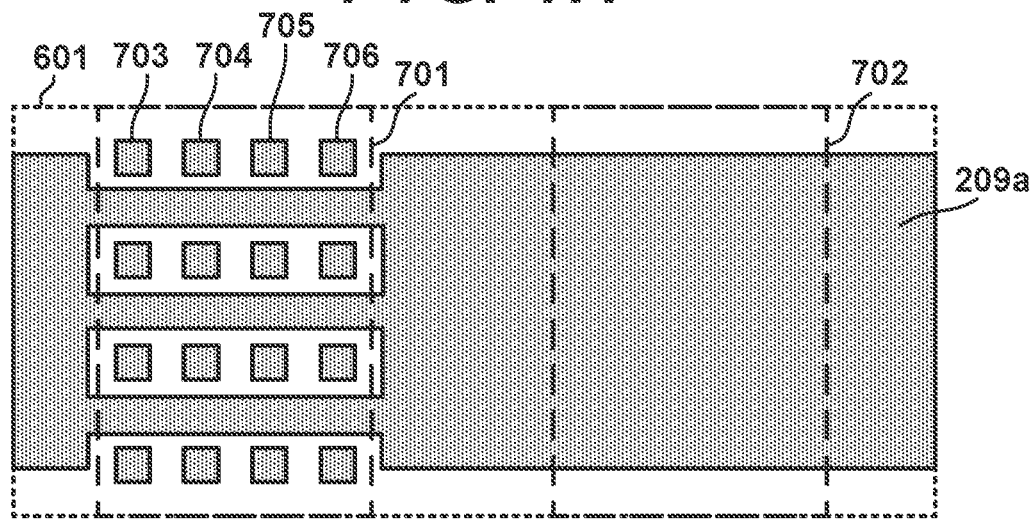
FIGS. 7A to 7C are views for explaining examples of the layout of an electrically conductive pattern according to the first embodiment.

FIG. 7A shows an example of the layout of the electrically conductive pattern 172 (FIGS. 2A and 2B) in a region 601 shown in FIG. 6A. Referring to FIG. 7A, a region 701 represents a position overlapping the vertical scanning circuit 208b in the planar view with respect to the boundary 103, and a region 702 represents a position overlapping the vertical scanning circuit 208c in the planar view with respect to the boundary 103.

An electrically conductive member 703 is a portion of the electrically conductive pattern 172 forming the electrically conductive member 541. An electrically conductive member 704 is a portion of the electrically conductive pattern 172 forming the electrically conductive member 531. An electrically conductive member 705 is a portion of the electrically conductive pattern 172 forming the electrically conductive member 521. An electrically conductive member 706 is a portion of the electrically conductive pattern 172 forming the electrically conductive member 511. The four electrically conductive members 703 to 706 arrayed in the horizontal direction in FIG. 7A supply the control signals for one row of the light-receiving array 201. FIG. 7A shows the electrically conductive members 703 to 706 of four rows of the light-receiving array 201.

In the region 701, the electrically conductive members 511, 521, 531, and 541 extend from the vertical scanning circuit 208b in the direction orthogonal to the boundary 103, and thus the electrically conductive pattern 172 includes the electrically conductive members 703 to 706. Therefore, the electrically conductive line 209a has a shape which is partially thin to avoid the electrically conductive members 703 to 706. Thus, the electrically conductive line 209a has a resistance value per unit length in the region 701 higher than that in a peripheral portion.

On the other hand, in the region 702, the electrically conductive members 511, 521, 531, and 541 need not extend from the vertical scanning circuit 208c in the direction orthogonal to the boundary 103, and thus the electrically conductive pattern 172 need not include the electrically conductive members 703 to 706. Therefore, the electrically conductive line 209a has the same resistance value per unit length in the region 702 as that in a peripheral portion. Furthermore, in the region 701, coupling between the electrically conductive line 209a and the electrically conductive members 703 to 706 and the vias connected to them occurs. However, in the region 702, since the electrically conductive members 703 to 706 and the vias connected to them do not exist, such coupling is reduced.

In the connection relationship shown in FIGS. 6A and 7A, only one of the vertical scanning circuits 208b and 208c is electrically connected to the driving lines 202. This can reduce coupling and the resistance of the electrically conductive line 209a, as compared with a case in which both the vertical scanning circuits 208b and 208c are electrically connected to the driving lines 202. That is, it is possible to reduce the influence, on the electrically conductive line 209 for conveying the signal other than the control signals, by the electrically conductive members for conveying the control signals from the vertical scanning circuit 208.

In the connection relationship shown in FIGS. 6A and 7A, by supplying, to the driving lines 202, the control signals from one of the vertical scanning circuits 208b and 208c located at a position overlapping the light-receiving array 201 in the planar view with respect to the boundary 103, the light-receiving circuit 106 is controlled at high speed. Alternatively, neither the vertical scanning circuit 208b nor 208c needs to be electrically connected to any of the plurality of driving lines 202. In this case as well, it is possible to supply the control signals from each of the vertical scanning circuits 208a and 208d to all the plurality of driving lines 202. Furthermore, the influence on another electrically conductive line 209 by the electrically conductive members for transferring the control signals from the vertical scanning circuit 208 can further be reduced.

Figure 6B:
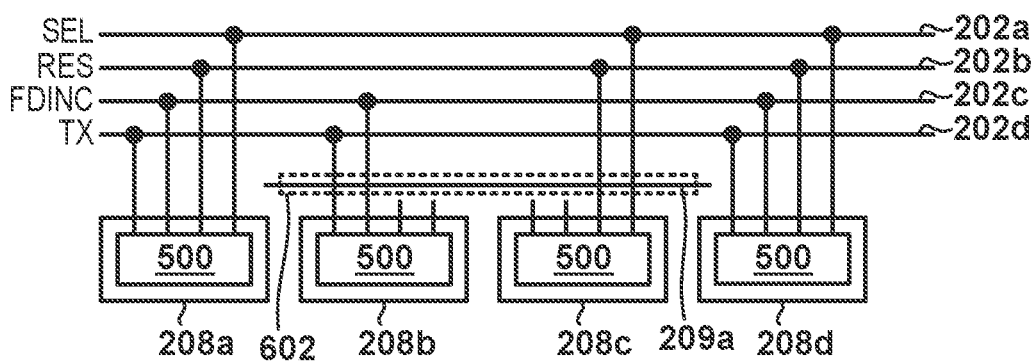

Another connection relationship among the vertical scanning circuits 208 and the driving lines 202 will be described with reference to FIGS. 6B and 7B. A description of an arrangement which may be the same as in FIGS. 6A and 7A will be omitted. FIG. 6B shows the connection relationship among the four vertical scanning circuits 208a to 208d and the four driving lines 202a to 202d for one row of the light-receiving array 201. The same connection relationship may apply to the remaining rows of the light-receiving array 201.

Each of the vertical scanning circuits 208a and 208d is electrically connected to all the four driving lines 202a to 202d for one row of the light-receiving array 201. If the same connection relationship applies to the remaining rows of the light-receiving array 201, each of the vertical scanning circuits 208a and 208d is electrically connected to all the plurality of driving lines 202 arranged for the light-receiving array 201, and supplies the control signals.

On the other hand, the vertical scanning circuit 208c is electrically connected to some of the four driving lines 202a to 202d for one row of the light-receiving array 201, and is not electrically connected to the remaining ones of the four driving lines 202a to 202d. More specifically, the vertical scanning circuit 208c is electrically connected to the driving lines 202a and 202b and is not electrically connected to the driving lines 202c and 202d. In the connection relationship shown in FIG. 6B, unlike the connection relationship shown in FIG. 6A, the vertical scanning circuit 208c functions as a vertical scanning circuit for supplying the control signals to some of the plurality of driving lines 202.

On the other hand, the vertical scanning circuit 208b is electrically connected to the driving lines 202 which are not electrically connected to the vertical scanning circuit 208c, among the four driving lines 202a to 202d for one row of the light-receiving array 201. More specifically, the vertical scanning circuit 208b is electrically connected to the driving lines 202c and 202d, and is not electrically connected to the driving lines 202a and 202b. Even in the connection relationship shown in FIG. 6B, by supplying the control signal from the two ends and center of the substrate to the one driving line 202, it becomes possible to control the light-receiving circuit 106 at high speed.

Figure 7B:
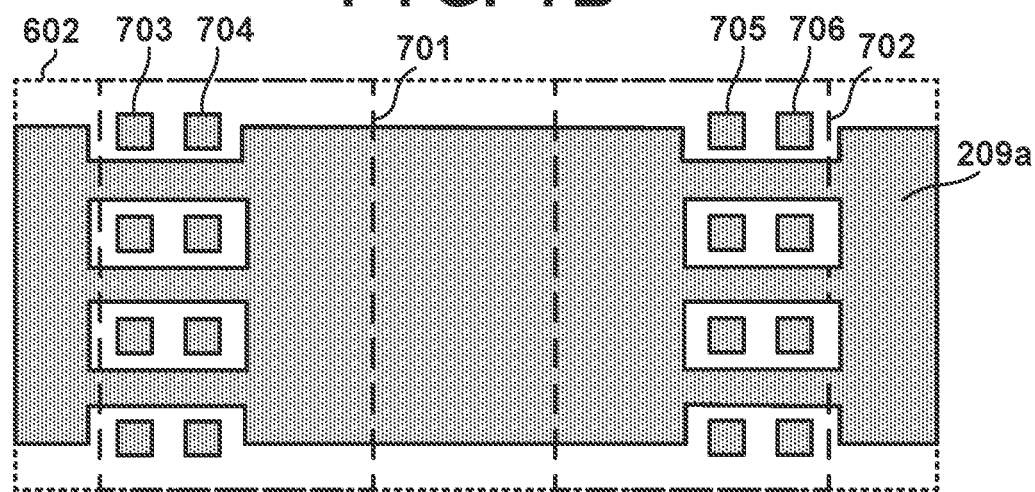

FIG. 7B shows an example of the layout of the electrically conductive pattern 172 (FIGS. 2A and 2B) in a region 602 shown in FIG. 6B. In this example of the layout as well, it is possible to reduce the influence, on the electrically conductive line 209 for conveying the signal other than the control signals, by the electrically conductive members for conveying the control signals from the vertical scanning circuit 208.

Figure 6C:
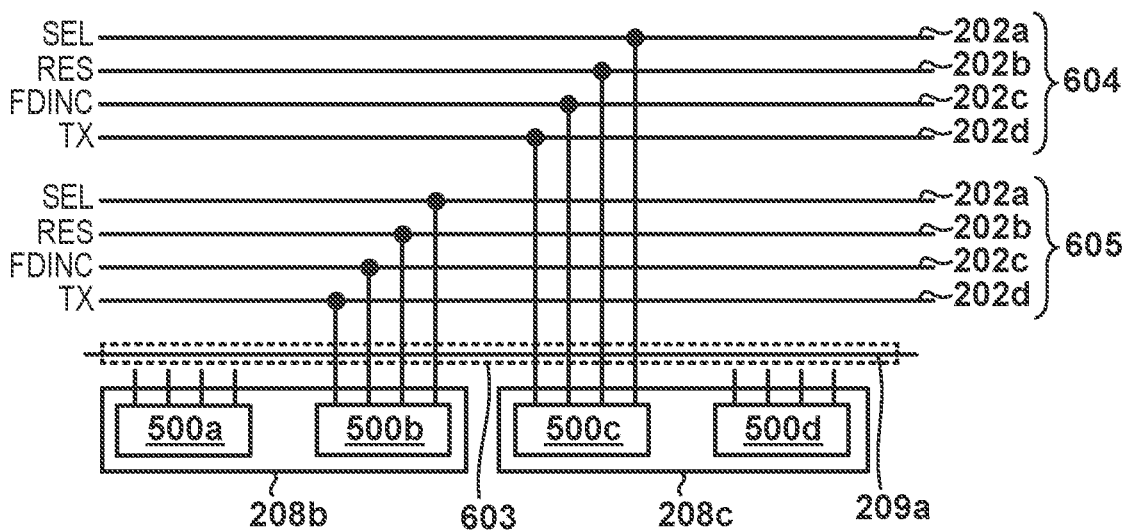

Still another connection relationship among the vertical scanning circuits 208 and the driving lines 202 will be described with reference to FIGS. 6C and 7C. A description of an arrangement which may be the same as in FIGS. 6A and 7A will be omitted. FIG. 6C shows the connection relationship among the two vertical scanning circuits 208b and 208c and the eight driving lines 202a to 202d in total for two rows of the light-receiving array 201. The same connection relationship may apply to other two rows of the light-receiving array 201. Each of the vertical scanning circuits 208a and 208d may be electrically connected to all the driving lines 202, similar to the example shown in FIG. 6A, and a description thereof will be omitted.

In the vertical scanning circuit 208b, a row driver circuit 500a arranged for one row 604 of the light-receiving array 201 is not electrically connected to any of the four driving lines 202a to 202d arranged for the row 604. On the other hand, in the vertical scanning circuit 208b, a row driver circuit 500b arranged for one row 605 of the light-receiving array 201 is electrically connected to all the four driving lines 202a to 202d arranged for the row 605. The rows 604 and 605 may be adjacent to each other.

In the vertical scanning circuit 208c, a row driver circuit 500c arranged for the row 604 of the light-receiving array 201 is electrically connected to all the four driving lines 202a to 202d arranged for the row 604. On the other hand, in the vertical scanning circuit 208c, a row driver circuit 500d arranged for the row 605 of the light-receiving array 201 is not electrically connected to any of the four driving lines 202a to 202d arranged for the row 605.

Even in the connection relationship shown in FIG. 6C, by supplying the control signal from the two ends and center of the substrate to the one driving line 202 in this way, it becomes possible to control the light-receiving circuit 106 at high speed.

Figure 7C:
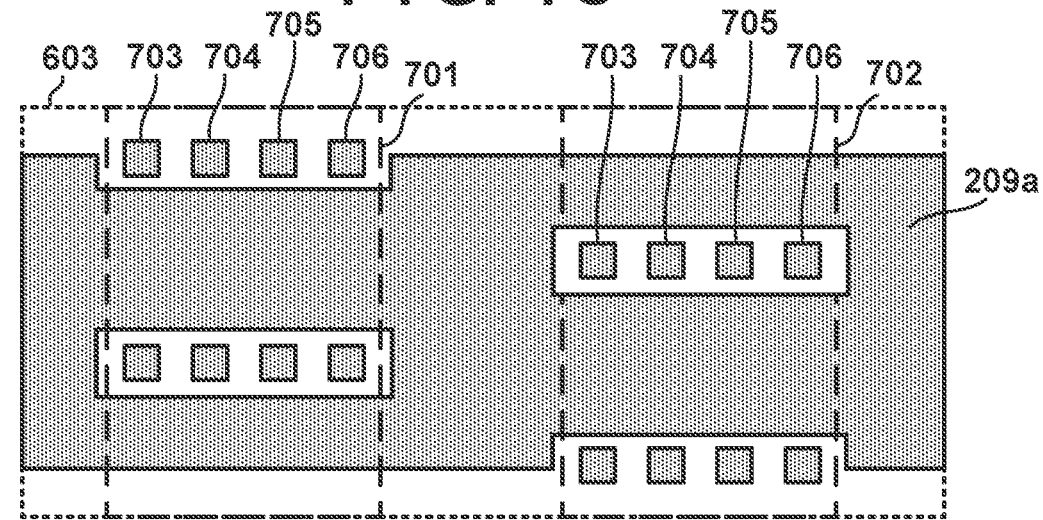

FIG. 7C shows an example of the layout of the electrically conductive pattern 172 (FIGS. 2A and 2B) in a region 603 shown in FIG. 6C. In this example of the layout as well, it is possible to reduce the influence, on the electrically conductive line 209 for conveying the signal other than the control signals, by the electrically conductive members for conveying the control signals from the vertical scanning circuit 208.

Second Embodiment

Figure 8A:
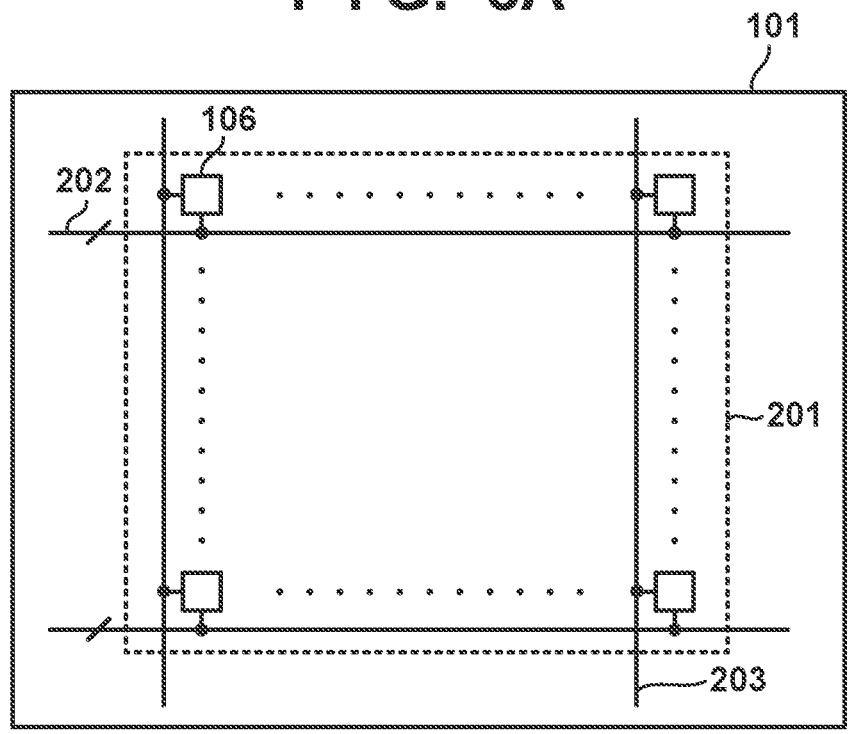
FIGS. 8A and 8B are views for explaining an example of the circuit layout of a photoelectric conversion apparatus according to a second embodiment.
Figure 8B:
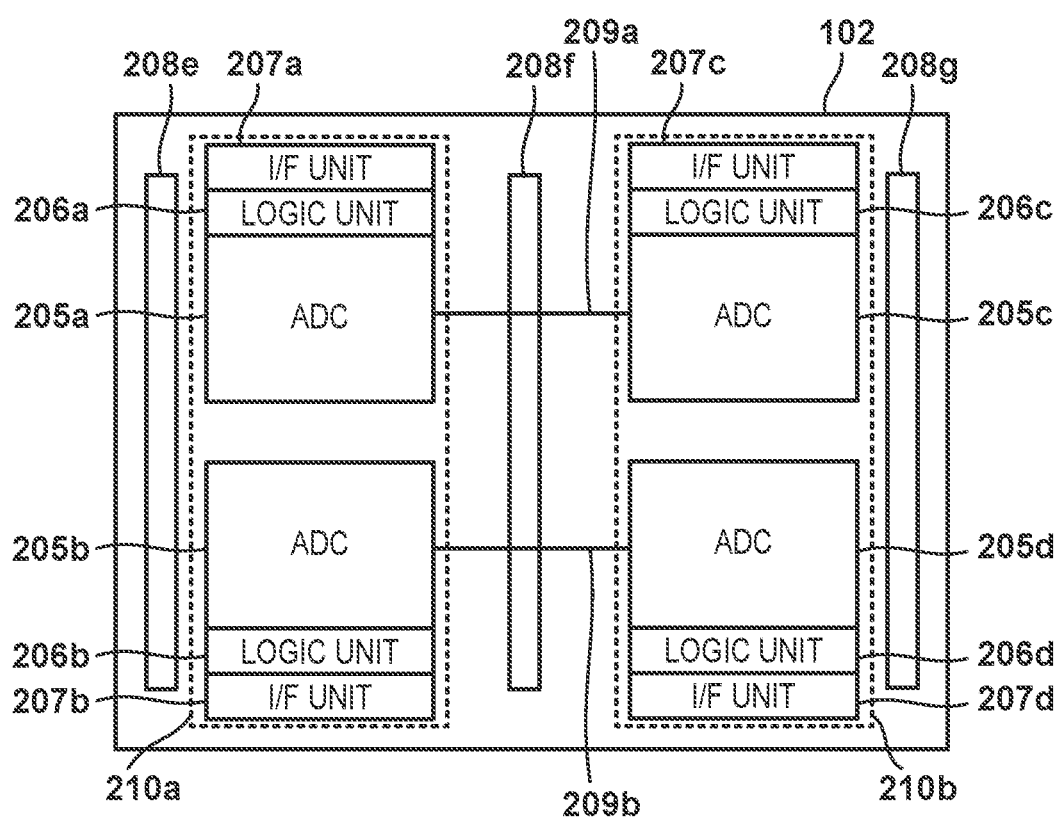
Figure 9:
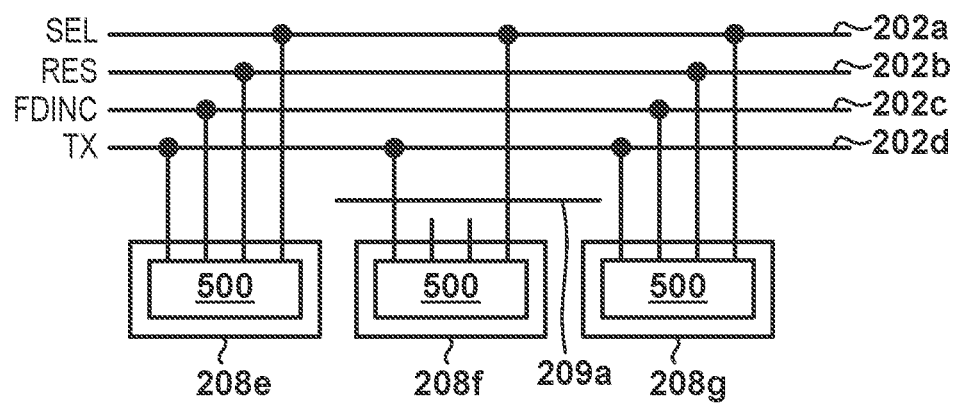
FIG. 9 is a view for explaining the connection relationship among vertical scanning circuits and driving lines according to the second embodiment.

An example of the arrangement of a photoelectric conversion apparatus 100 according to the second embodiment will be described with reference to FIGS. 8A to 9. A description of an arrangement which may be the same as in the first embodiment will be omitted.

An example of the circuit layout of the photoelectric conversion apparatus 100 according to the second embodiment will be described with reference to FIGS. 8A and 8B. FIG. 8A shows an example of the layout of a light-receiving substrate 101, and FIG. 8B shows an example of the layout of a circuit substrate 102. In the second embodiment, all the layers of the circuit substrate 102 may be formed by one-shot exposure. Therefore, a vertical scanning circuit 208 located at the center of the circuit substrate 102 may include only a vertical scanning circuit 208f.

The vertical scanning circuit 208f is located between a processing circuit 210a and a processing circuit 210b. Therefore, each of electrically conductive lines 209a and 209b extends to overlap the vertical scanning circuit 208f and intersect the vertical scanning circuit 208f in a planar view with respect to a boundary 103. A vertical scanning circuit 208e is located between the processing circuit 210a and the edge of the photoelectric conversion apparatus 100. A vertical scanning circuit 208g is located between the processing circuit 210b and the edge of the photoelectric conversion apparatus 100. Both the electrically conductive lines 209a and 209b intersect the vertical scanning circuit 208f but do not intersect the vertical scanning circuits 208e and 208f in the planar view with respect to the boundary 103. The processing circuit 210a is located between the vertical scanning circuits 208e and 208f. The processing circuit 210b is located between the vertical scanning circuits 208g and 208f. The vertical scanning circuit 208f is located at a position overlapping the light-receiving array 201 in the planar view with respect to the boundary 103. All the vertical scanning circuits 208e to 208g may have the same circuit arrangement.

The connection relationship among the vertical scanning circuits 208 and driving lines 202 will be described with reference to FIG. 9. FIG. 9 shows the connection relationship among the three vertical scanning circuits 208e to 208g and four driving lines 202a to 202d for one row of the light-receiving array 201. The same connection relationship may apply to the remaining rows of the light-receiving array 201. The electrically conductive line 209a is located between the vertical scanning circuit 208f and the driving lines 202 but is not located between the driving lines 202 and the vertical scanning circuits 208e and 208g.

Each of the vertical scanning circuits 208e and 208g is electrically connected to all the four driving lines 202a to 202d for one row of the light-receiving array 201. If the same connection relationship applies to the remaining rows of the light-receiving array 201, each of the vertical scanning circuits 208e and 208g is electrically connected to all the plurality of driving lines 202 arranged for the light-receiving array 201, and supplies the control signals.

On the other hand, the vertical scanning circuit 208f is electrically connected to some of the four driving lines 202a to 202d for one row of the light-receiving array 201. For example, the vertical scanning circuit 208f is electrically connected to the driving lines 202a and 202d and is not electrically connected to the driving lines 202b and 202c. Thus, since the driving lines 202a and 202d are supplied with the control signals also from the center of the circuit substrate 102, it is possible to implement high-speed control, as compared with the driving lines 202b and 202c. Furthermore, since the vertical scanning circuit 208f is not electrically connected to some of the four driving lines 202, it is possible to reduce the influence, on the electrically conductive line 209 for conveying the signal other than the control signals, by the electrically conductive members for conveying the control signals from the vertical scanning circuit 208.

Third Embodiment

An example of the arrangement of a photoelectric conversion apparatus 100 according to the third embodiment will be described with reference to FIGS. 10A to 11C. A description of an arrangement which may be the same as in the first embodiment will be omitted.

Figure 10A:
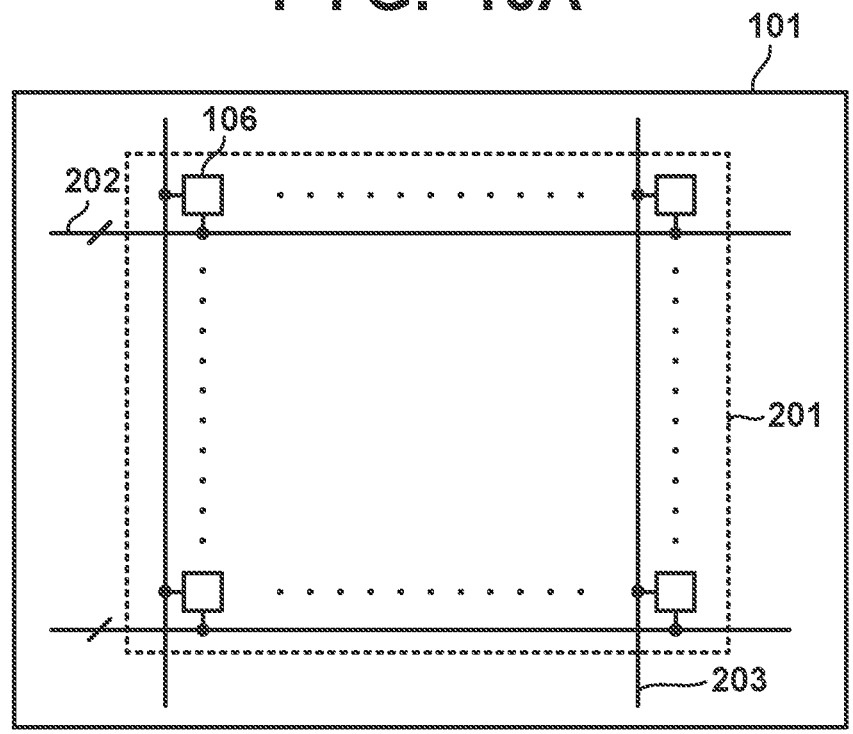
FIGS. 10A and 10B are views for explaining an example of the circuit layout of a photoelectric conversion apparatus according to a third embodiment.
Figure 10B:
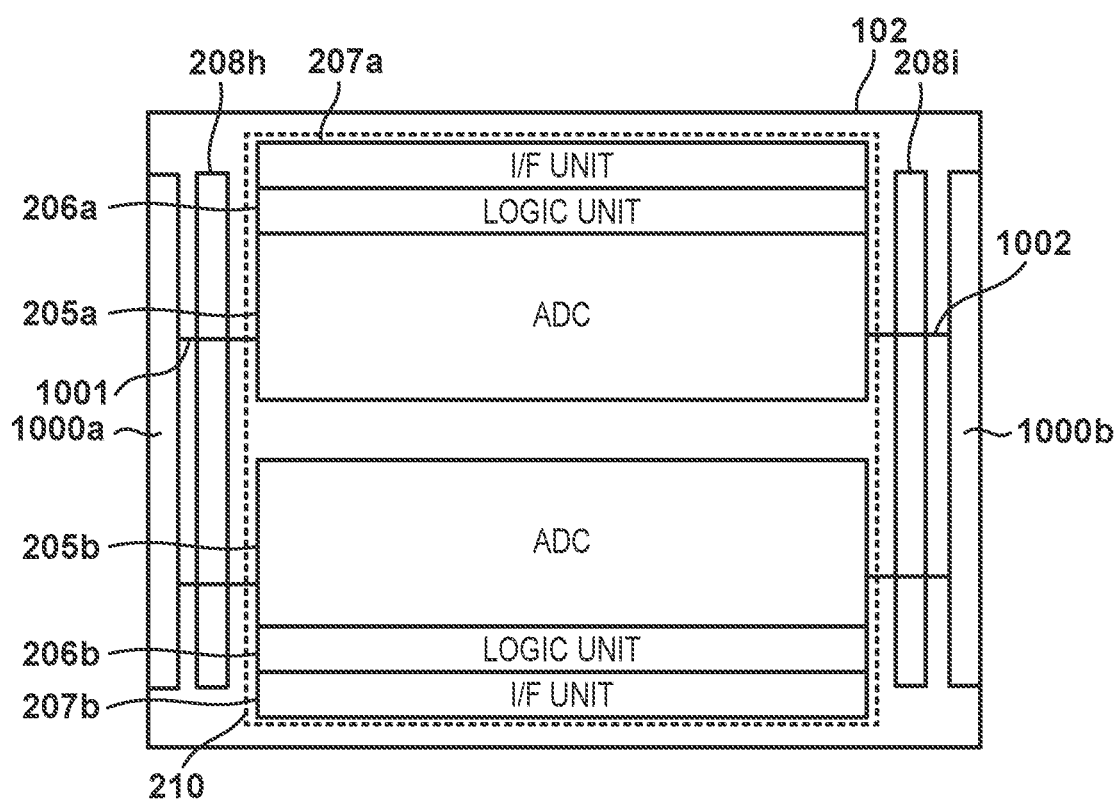

An example of the circuit layout of the photoelectric conversion apparatus 100 according to the third embodiment will be described with reference to FIGS. 10A and 10B. FIG. 10A shows an example of the layout of a light-receiving substrate 101, and FIG. 10B shows an example of the layout of a circuit substrate 102. In the third embodiment, all the layers of the circuit substrate 102 may be formed by one-shot exposure. In the third embodiment, the circuit substrate 102 includes no vertical scanning circuit 208 at the center (that is, a position overlapping a light-receiving array 201) of the circuit substrate 102.

The circuit substrate 102 includes, at the left edge, a pad region 1000a in which an electrode pad (for example, an electrode pad 111) for external connection is arranged. The circuit substrate 102 includes, at the right edge, a pad region 1000b in which an electrode pad (for example, the electrode pad 111) for external connection is arranged. The circuit substrate 102 includes vertical scanning circuits 208h and 208i. The vertical scanning circuit 208h is located between a processing circuit 210 and the pad region 1000a. The pad region 1000a is located between the vertical scanning circuit 208h and the edge of the photoelectric conversion apparatus 100. The vertical scanning circuit 208i is located between the processing circuit 210 and the pad region 1000b. The pad region 1000b is located between the vertical scanning circuit 208i and the edge of the photoelectric conversion apparatus 100. Each of the vertical scanning circuits 208h and 208i is located at a position not overlapping the light-receiving array 201 in a planar view with respect to a boundary 103.

The processing circuit 210 and the electrode pad in the pad region 1000a are electrically connected by an electrically conductive line 1001. The electrically conductive line 1001 is used for signal transfer or power supply. The electrically conductive line 1001 extends to overlap the vertical scanning circuit 208h and intersect the vertical scanning circuit 208h in the planar view with respect to the boundary 103.

The processing circuit 210 and the electrode pad in the pad region 1000b are electrically connected by an electrically conductive line 1002. The electrically conductive line 1002 is used for signal transfer or power supply. The vertical scanning circuits 208h and 208i may have the same circuit arrangement. The electrically conductive line 1002 extends to overlap the vertical scanning circuit 208i and intersect the vertical scanning circuit 208i in the planar view with respect to the boundary 103.

Figure 11A:
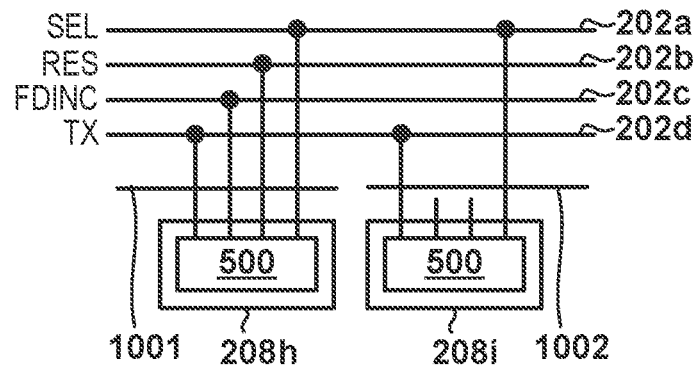
FIGS. 11A to 11C are views for explaining the connection relationships among vertical scanning circuits and driving lines according to the third embodiment.
Figure 11B:
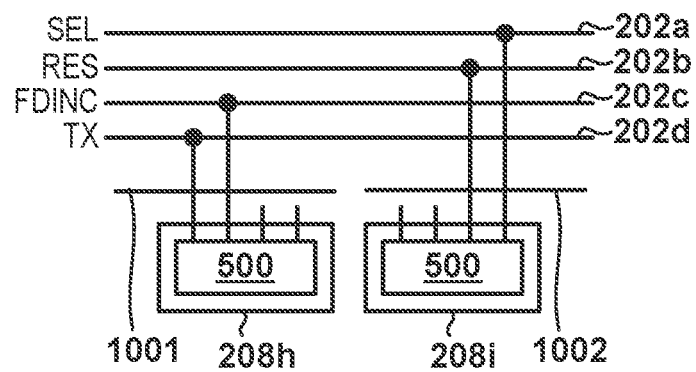

The connection relationships among the vertical scanning circuits 208 and driving lines 202 will be described with reference to FIGS. 11A to 11C. FIG. 11A shows the connection relationship among the two vertical scanning circuits 208h to 208i and four driving lines 202a to 202d for one row of the light-receiving array 201. The same connection relationship may apply to the remaining rows of the light-receiving array 201. The electrically conductive line 1001 is located between the vertical scanning circuit 208h and the driving lines 202, and the electrically conductive line 1002 is located between the vertical scanning circuit 208i and the driving lines 202.

The vertical scanning circuit 208h is electrically connected to all the four driving lines 202a to 202d for one row of the light-receiving array 201. If the same connection relationship applies to the remaining rows of the light-receiving array 201, the vertical scanning circuit 208h is electrically connected to all the plurality of driving lines 202 arranged for the light-receiving array 201, and supplies control signals.

On the other hand, the vertical scanning circuit 208i is electrically connected to only some of the four driving lines 202a to 202d for one row of the light-receiving array 201. For example, the vertical scanning circuit 208i is electrically connected to the driving lines 202a and 202d and is not electrically connected to the driving lines 202b and 202c. Thus, since the driving lines 202a and 202d are supplied with the control signals from the two sides of the circuit substrate 102, it is possible to implement high-speed control, as compared with the driving lines 202b and 202c. Furthermore, since the vertical scanning circuit 208i is not electrically connected to some of the four driving lines 202, it is possible to reduce the influence on the electrically conductive line 1002 by the electrically conductive members for conveying the control signals from the vertical scanning circuit 208i.

Another connection relationship among the vertical scanning circuits 208 and the driving lines 202 will be described with reference to FIG. 11B. A description of an arrangement which may be the same as in FIG. 11A will be omitted. FIG. 11B shows the connection relationship among the two vertical scanning circuits 208h and 208i and the four driving lines 202a to 202d for one row of the light-receiving array 201. The same connection relationship may apply to the remaining rows of the light-receiving array 201.

The vertical scanning circuit 208i is electrically connected to some of the four driving lines 202a to 202d for one row of the light-receiving array 201, and is not electrically connected to the remaining ones of the four driving lines 202a to 202d. More specifically, the vertical scanning circuit 208i is electrically connected to the driving lines 202a and 202b and is not electrically connected to the driving lines 202c and 202d.

On the other hand, the vertical scanning circuit 208h is electrically connected to the driving lines 202 which are not electrically connected to the vertical scanning circuit 208i, among the four driving lines 202a to 202d for one row of the light-receiving array 201. More specifically, the vertical scanning circuit 208h is electrically connected to the driving lines 202c and 202d, and is not electrically connected to the driving lines 202a and 202b. Even in the connection relationship shown in FIG. 11B, the control signals are supplied to the respective driving lines 202. In this example of the layout as well, it is possible to reduce the influence on the electrically conductive lines 1001 and 1002 by the electrically conductive members for conveying the control signals from the vertical scanning circuits 208h and 208i.

Still another connection relationship among the vertical scanning circuits 208 and the driving lines 202 will be described with reference to FIG. 11C. A description of an arrangement which may be the same as in FIG. 11A will be omitted. FIG. 11C shows the connection relationship among the two vertical scanning circuits 208h and 208i and the eight driving lines 202a to 202d in total for two rows of the light-receiving array 201. The same connection relationship may apply to other two rows of the light-receiving array 201.

In the vertical scanning circuit 208h, a row driver circuit 500a arranged for one row 604 of the light-receiving array 201 is not electrically connected to any of the four driving lines 202a to 202d arranged for the row 604. On the other hand, in the vertical scanning circuit 208h, a row driver circuit 500b arranged for another row 605 of the light-receiving array 201 is electrically connected to all the four driving lines 202a to 202d arranged for the row 605. The rows 604 and 605 may be adjacent to each other.

In the vertical scanning circuit 208i, a row driver circuit 500c arranged for the row 604 of the light-receiving array 201 is electrically connected to all the four driving lines 202a to 202d arranged for the row 604. On the other hand, in the vertical scanning circuit 208i, a row driver circuit 500d arranged for the row 605 of the light-receiving array 201 is not electrically connected to any of the four driving lines 202a to 202d arranged for the row 605.

Figure 11C:
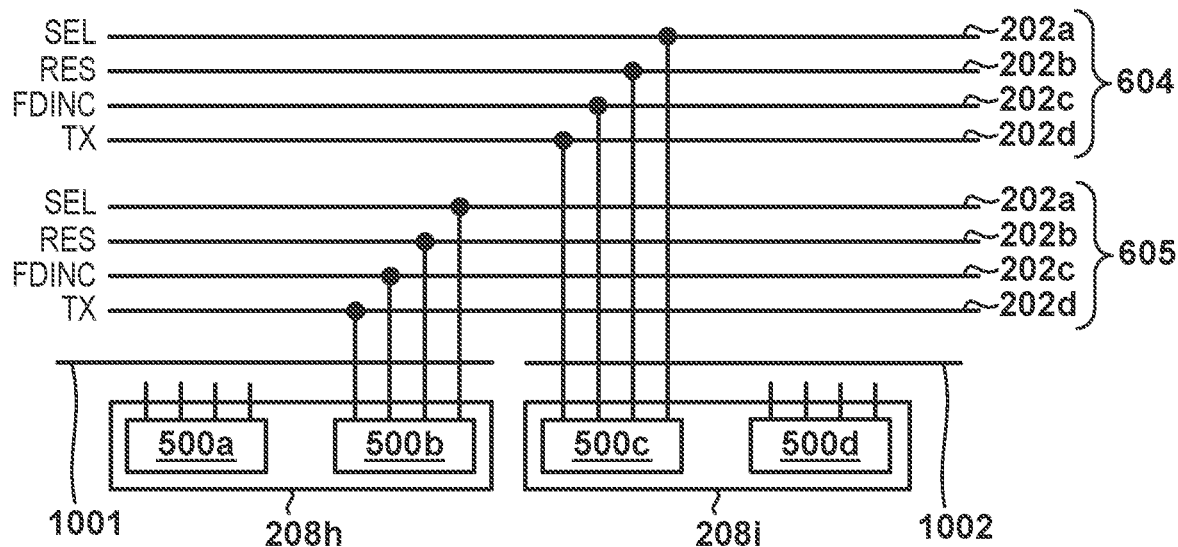

Even in the connection relationship shown in FIG. 11C, the control signals are supplied to the respective driving lines 202. In this example of the layout as well, it is possible to reduce the influence on the electrically conductive lines 1001 and 1002 by the electrically conductive members for conveying the control signals from the vertical scanning circuits 208h and 208i.

<Modification>

In the above-described first and second embodiments, the electrically conductive line 209 intersecting the vertical scanning circuit 208 conveys the ramp signal. Alternatively, the electrically conductive line 209 intersecting the vertical scanning circuit 208 may be used for transfer of another signal different from the control signal or may be used for power supply. For example, the electrically conductive line 209 may convey the ground voltage or the power supply voltage of the A/D conversion unit 205, convey a bias voltage, or convey a pulse signal.

In the above-described embodiments, each of all the vertical scanning circuits 208 arranged in the circuit substrate 102 is located at a position overlapping all the plurality of driving lines 202 in the planar view with respect to the boundary 103. Alternatively, each vertical scanning circuit 208 may overlap only some of the plurality of driving lines 202. For example, the vertical scanning circuit 208a may be divided into two circuits, and one circuit may scan the upper half of the plurality of driving lines 202 and the other circuit may scan the lower half of the driving lines 202.

Other Embodiments

Figure 12A:
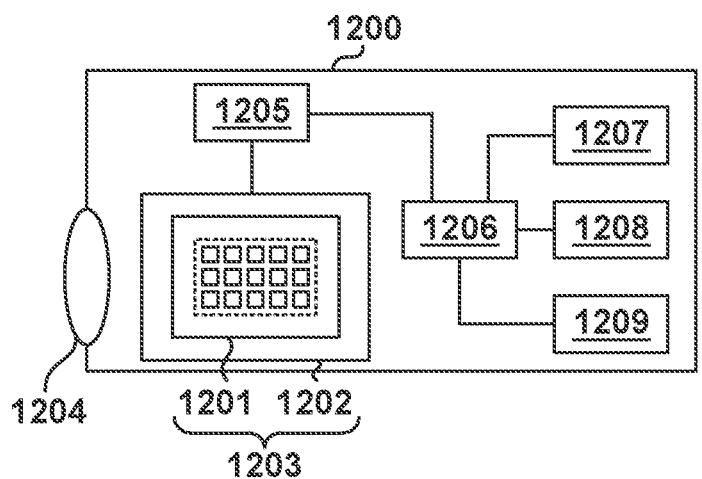
FIGS. 12A to 12C are views for explaining an example of the arrangement of an equipment according to some embodiments.

An embodiment of an equipment 1200 including a semiconductor apparatus 1203 will be described in detail with reference to FIG. 12A. The semiconductor apparatus 1203 may be a photoelectric conversion apparatus according to any one of the above-described embodiments. The semiconductor apparatus 1203 may include a semiconductor device 1201 and a package 1202 accommodating the semiconductor device 1201. The package 1202 may include a base on which the semiconductor device 1201 is fixed and a cover made of glass or the like facing the semiconductor device 1201. The package 1202 may further include a bonding member such as a bonding wire and bump for connecting a terminal of the base and a terminal (bonding pad) of the semiconductor device 1201.

The equipment 1200 may include at least one of an optical apparatus 1204, a control apparatus 1205, a processing apparatus 1206, a display apparatus 1207, a storage apparatus 1208, and a mechanical apparatus 1209. The optical apparatus 1204 is implemented by, for example, a lens, a shutter, and a mirror. The control apparatus 1205 controls the semiconductor apparatus 1203. The control apparatus 1205 is, for example, a semiconductor apparatus such as a Field Programmable Gate Array (FPGA) or an Application Specific Integrated Circuit (ASIC).

The processing apparatus 1206 processes a signal output from the semiconductor apparatus 1203. The processing apparatus 1206 is a semiconductor apparatus such as a Central Processing Unit (CPU) or an ASIC for forming an Analog Front End (AFE) or a Digital Front End (DFE). The display apparatus 1207 is an Electro-Luminescence (EL) display apparatus or a liquid crystal display apparatus that displays information (image) obtained by the semiconductor apparatus 1203. The storage apparatus 1208 is a magnetic device or a semiconductor device that stores the information (image) obtained by the semiconductor apparatus 1203. The storage apparatus 1208 is a volatile memory such as a Static Random Access Memory (SRAM) or a Dynamic Random Access Memory (DRAM) or a nonvolatile memory such as a flash memory or a hard disk drive.

The mechanical apparatus 1209 includes a moving or propulsion unit such as a motor or an engine. In the equipment 1200, the mechanical apparatus 1209 displays the signal output from the semiconductor apparatus 1203 on the display apparatus 1207 and performs external transfer by a communication apparatus (not shown) of the equipment 1200. To do this, the equipment 1200 may further include the storage apparatus 1208 and the processing apparatus 1206 in addition to the memory circuits and arithmetic circuits included in the semiconductor apparatus 1203. The mechanical apparatus 1209 may be controlled based on the signal output from the semiconductor apparatus 1203.

In addition, the equipment 1200 is suitable for an electronic equipment such as an information terminal (for example, a smartphone or a wearable terminal) which has a shooting function or a camera (for example, an interchangeable lens camera, a compact camera, a video camera, or a monitoring camera). The mechanical apparatus 1209 in the camera may drive the components of the optical apparatus 1204 in order to perform zooming, an in-focus operation, and a shutter operation. Alternatively, the mechanical apparatus 1209 in the camera may move the semiconductor apparatus 1203 in order to perform an anti-vibration operation.

Furthermore, the equipment 1200 can be a transportation equipment such as a vehicle, a ship, or an airplane. The mechanical apparatus 1209 in a transportation equipment can be used as a moving apparatus. The equipment 1200 as a transportation equipment may be used as an equipment that transports the semiconductor apparatus 1203 or an equipment that uses a shooting function to assist and/or automate driving (steering). The processing apparatus 1206 for assisting and/or automating driving (steering) may perform, based on the information obtained by the semiconductor apparatus 1203, processing for operating the mechanical apparatus 1209 as a moving apparatus. Alternatively, the equipment 1200 may be a medical equipment such as an endoscope, a measurement equipment such as an analysis distance measurement sensor, an analysis equipment such as an electron microscope, or an office equipment such as a copy machine.

Figure 12B:
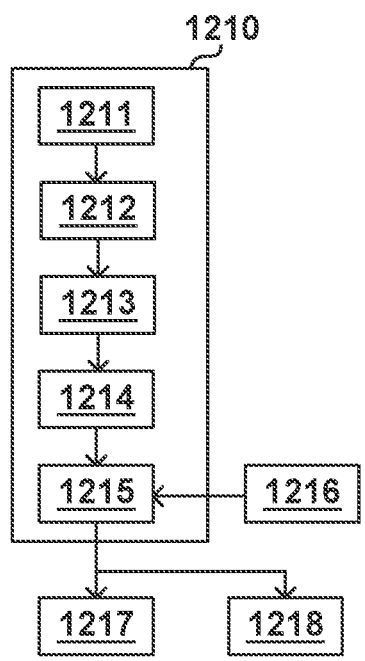
Figure 12C:
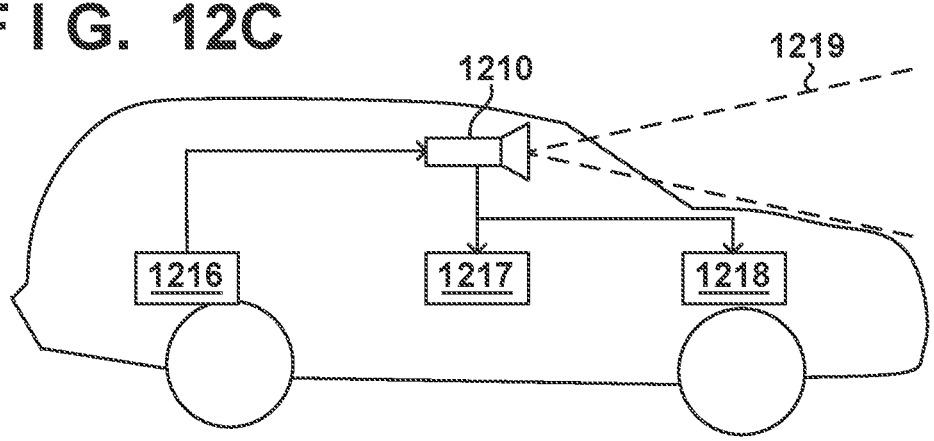

An embodiment of an image capturing system and a moving body will be described with reference to FIGS. 12B and 12C. FIG. 12B shows an example of an image capturing system 1210 concerning an in-vehicle camera. The image capturing system 1210 includes a photoelectric conversion apparatus 1211. The photoelectric conversion apparatus 1211 may be any one of the photoelectric conversion apparatuses described in the above embodiments. The image capturing system 1210 includes an image processing unit 1212 as a processing apparatus that performs image processing for a plurality of image data acquired by the photoelectric conversion apparatus 1211. The image capturing system 1210 also includes a parallax acquisition unit 1213 as a processing apparatus that calculates a parallax (the phase difference of a parallax image) from the plurality of image data acquired by the photoelectric conversion apparatus 1211. In addition, the image capturing system 1210 includes a distance acquisition unit 1214 as a processing apparatus that calculates the distance to a target object based on the calculated parallax, and a collision determination unit 1215 as a processing apparatus that determines based on the calculated distance whether there is a collision possibility. In this example, the parallax acquisition unit 1213 and the distance acquisition unit 1214 are examples of an information acquisition unit that acquires information such as distance information to a target object. That is, the distance information is information about a parallax, a defocus amount, a distance to a target object, or the like. The collision determination unit 1215 may determine the collision possibility using one of these pieces of distance information. Each of the above-described various kinds of processing apparatuses may be implemented by specially designed hardware or by general-purpose hardware for performing arithmetic processing based on a software module. Alternatively, each processing apparatus may be implemented by an FPGA, an ASIC, or the like or by a combination thereof.

The image capturing system 1210 is connected to a vehicle information acquisition apparatus 1216, and can acquire vehicle information such as a vehicle speed, a yaw rate, and a steering angle. The image capturing system 1210 is connected to a control ECU 1217 as a control apparatus that outputs a control signal to generate a braking force to the vehicle based on the determination result of the collision determination unit 1215. That is, the control ECU 1217 is an example of a moving body control unit that controls a moving body based on distance information. The image capturing system 1210 is also connected to an alarm device 1218 that generates an alarm to the driver based on the determination result of the collision determination unit 1215. For example, if the collision possibility is high as the determination result of the collision determination unit 1215, the control ECU 1217 performs vehicle control to avoid a collision or reduce damage by, for example, applying the brake, returning the accelerator, or suppressing the engine output. The alarm device 1218 warns the user by, for example, generating an alarm sound or the like, displaying alarm information on the screen of a car navigation system or the like, or giving a vibration to a seat belt or steering wheel.

In this embodiment, the image capturing system 1210 captures the periphery, for example, the front or rear of the vehicle. FIG. 12C shows the image capturing system 1210 in a case in which the front of the vehicle (image capturing range 1219) is captured. The vehicle information acquisition apparatus 1216 sends an instruction to operate the image capturing system 1210 and execute image capturing.

An example in which control is performed not to cause a collision against another vehicle has been described above. However, the image capturing system can also be applied to control for automated driving following another vehicle or automated driving without deviation from a lane. Furthermore, the image capturing system can be applied not only to a vehicle such as an automobile but also to, for example, a moving body (transportation equipment) such as a ship, an airplane, or an industrial robot. The moving apparatus in the moving body (transportation equipment) includes various kinds of moving units such as an engine, motor, wheels, and propellers. In addition, the image capturing system can be applied not only to the moving body but also to an equipment that widely uses object recognition, such as an Intelligent Transportation System (ITS).

The above-described embodiments can be changed appropriately without departing from the technical concept. Note that contents disclosed in this specification include not only contents described in this specification but also all items that can be grasped from this specification and its accompanying drawings. The contents disclosed in this specification include a complementary set of concepts described in this specification. That is, if, for example, "A is larger than B" is described in this specification, this specification is considered to disclose "A is not larger than B" even if a description of "A is not larger than B" is omitted. This is because if "A is larger than B" is described, it is assumed that a case in which "A is not larger than B" has been considered. To apprise the public of the scope of the present invention, the following claims are made.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-028981, filed Feb. 25, 2021, which is hereby incorporated by reference herein in its entirety.

What is claimed is:

1. A photoelectric conversion apparatus obtained by bonding a first substrate and a second substrate, wherein
the first substrate comprises
a light-receiving array including a plurality of light-receiving circuits arranged in an array, and
a plurality of driving lines configured to supply control signals to the light-receiving array,
the second substrate comprises
a first circuit that includes a driver circuit group configured to generate the control signals and is configured to function as a vertical scanning circuit which supplies the control signals to at least some of the plurality of driving lines, and
a second circuit including a circuit group having the same arrangement as that of the driver circuit group,
the second circuit is located at a position overlapping the at least some driving lines supplied with the control signals from the first circuit in a planar view with respect to a boundary between the first substrate and the second substrate,
the at least some driving lines supplied with the control signals from the first circuit include a driving line which is not electrically connected to the second circuit, and
the second substrate includes, at a position overlapping the second circuit in the planar view with respect to the boundary, an electrically conductive line used for one of power supply or transfer of a signal different from the control signals.

2. The apparatus according to claim 1, wherein the second circuit is configured to function as a vertical scanning circuit that supplies the control signals to at least some of the plurality of driving lines.

3. The apparatus according to claim 2, wherein
at least two driving lines are arranged for each row of the light-receiving array, and
the second circuit is electrically connected to some of the at least two driving lines for one row of the light-receiving array and is not electrically connected to the remaining ones of the at least two driving lines.

4. The apparatus according to claim 2, wherein
at least two driving lines are arranged for each row of the light-receiving array, and
the second circuit is not electrically connected to any of the at least two driving lines for one row of the light-receiving array, and is electrically connected to one of the at least two driving lines for another row of the light-receiving array.

5. The apparatus according to claim 1, wherein the second circuit is not electrically connected to any of the plurality of driving lines.

6. The apparatus according to claim 3, wherein
at least two driving lines are arranged for each row of the light-receiving array, and
the first circuit is electrically connected to all the at least two driving lines for one row of the light-receiving array.

7. The apparatus according to claim 2, wherein the second substrate further includes, between the first circuit and the second circuit, a processing circuit configured to process a signal obtained in the light-receiving array.

8. The apparatus according to claim 7, wherein
the second substrate further includes a third circuit that includes a driver circuit group configured to generate the control signals and is configured to function as a vertical scanning circuit which supplies the control signals to at least some of the plurality of driving lines, and
the third circuit is located between the processing circuit and the second circuit.

9. The apparatus according to claim 8, wherein the plurality of driving lines include a driving line that is not electrically connected to the second circuit and is electrically connected to the third circuit.

10. The apparatus according to claim 2, wherein
the second substrate includes a semiconductor layer in which a circuit element is formed,
the semiconductor layer includes a first region and a second region, each of the first region and the second region having the same circuit arrangement,
the first circuit is included in the first region, and
the second circuit is included in the second region.

11. The apparatus according to claim 10, wherein the electrically conductive line electrically connects the circuit formed in the first region and the circuit formed in the second region.

12. The apparatus according to claim 1, wherein the second circuit is located at a position overlapping the light-receiving array in the planar view with respect to the boundary.

13. The apparatus according to claim 1, wherein the second circuit is located between the light-receiving array and an edge of the photoelectric conversion apparatus in the planar view with respect to the boundary.

14. The apparatus according to claim 13, wherein
the second substrate further includes an electrode pad located between the second circuit and an edge of the photoelectric conversion apparatus in the planar view with respect to the boundary, and
the electrically conductive line is electrically connected to the electrode pad.

15. An equipment comprising:
a photoelectric conversion apparatus defined in claim 1; and
at least one of an optical apparatus corresponding to the photoelectric conversion apparatus,
a control apparatus configured to control the photoelectric conversion apparatus,
a processing apparatus configured to process a signal output from the photoelectric conversion apparatus,
a display apparatus configured to display information obtained by the photoelectric conversion apparatus,
a storage apparatus configured to store the information obtained by the photoelectric conversion apparatus, and
a mechanical apparatus configured to operate based on the information obtained by the photoelectric conversion apparatus.

* * * * *